United States Patent [19]

Strangman

[11] Patent Number: 4,914,794

[45] Date of Patent: Apr. 10, 1990

[54] METHOD OF MAKING AN ABRADABLE STRAIN-TOLERANT CERAMIC COATED TURBINE SHROUD

[75] Inventor: Thomas E. Strangman, Phoenix, Ariz.

[73] Assignee: Allied-Signal Inc., Phoenix, Ariz.

[21] Appl. No.: 125,310

[22] Filed: Nov. 25, 1987

Related U.S. Application Data

[62] Division of Ser. No. 894,409, Aug. 7, 1986, Pat. No. 4,764,089.

[51] Int. Cl.⁴ .......... B23P 9/00

[52] U.S. Cl. .......... 29/889.2; 29/527.2

[58] Field of Search .......... 29/23.5, 156.8 R, 156.8 B, 29/156.8 H, 156.8 P, 157 R, 156.4 R, 527.2, 596; 51/103 R; 415/116, 174, 197; 277/53

[56] References Cited

U.S. PATENT DOCUMENTS

| | | | |
|---|---|---|---|
| 2,507,079 | 5/1950 | Zimmerman | 51/103 R X |
| 3,042,365 | 7/1962 | Curtis et al. | 29/156.8 X |
| 3,970,319 | 7/1976 | Carroll et al. | 415/174 X |
| 4,063,742 | 12/1977 | Watkins, Jr. | 277/53 |
| 4,323,394 | 4/1982 | Hoffmüller et al. | 29/156.8 R X |
| 4,405,284 | 9/1983 | Albrecht et al. | 415/174 X |
| 4,460,311 | 7/1984 | Trappmann et al. | 415/116 X |
| 4,610,320 | 9/1986 | Beakley | 29/527.2 X |
| 4,623,087 | 11/1986 | Conolly | 29/527.2 X |
| 4,646,810 | 3/1987 | Lardellier | 29/156.8 R X |
| 4,764,089 | 8/1988 | Strangman | 415/174 |

*Primary Examiner*—Timothy V. Eley
*Assistant Examiner*—Peter Vo
*Attorney, Agent, or Firm*—R. Steven Linne; James W. McFarland

[57] ABSTRACT

An abradable ceramic coated turbine shroud structure includes a grid of slant-steps isolated by grooves in a superalloy metal shroud substrate. A thin NiCrAlY bonding layer is formed on the machined slant-steps. A stabilized zirconia layer is plasma sprayed on the bonding layer at a sufficiently large spray angle to cause formation of deep shadow gaps in the zirconia layer. The shadow gaps provide a high degree of thermal strain tolerance, avoiding spalling. The exposed surface of the zirconia layer is machined nearly to the shadow gap ends. The turbine blade tips are treated to minimize blade tip wear during initial abrading of the zirconia layer. The procedure results in very close blade tip-to-shroud tolerances after the initial abrading.

11 Claims, 3 Drawing Sheets

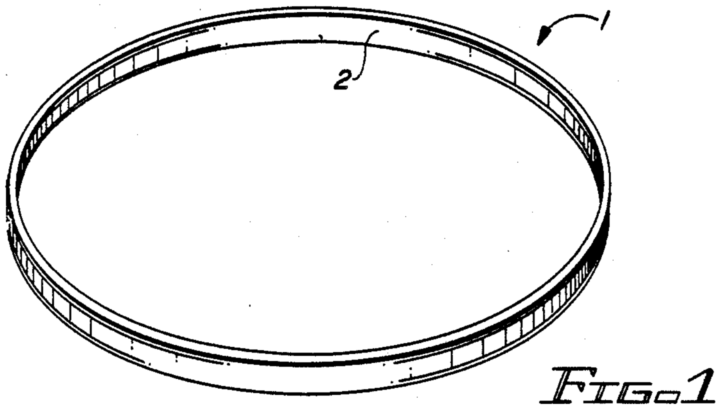
FIG. 1
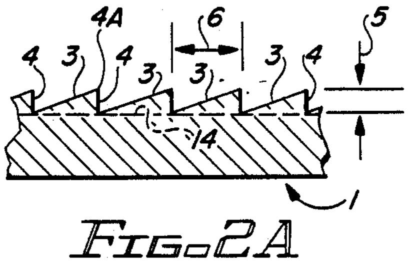
FIG. 2A
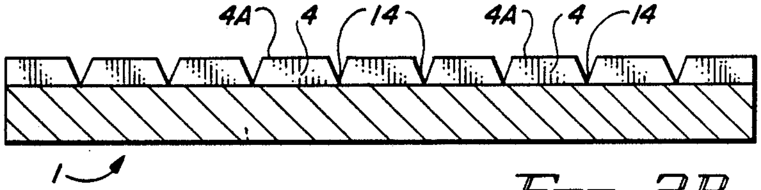
FIG. 2B
FIG. 2
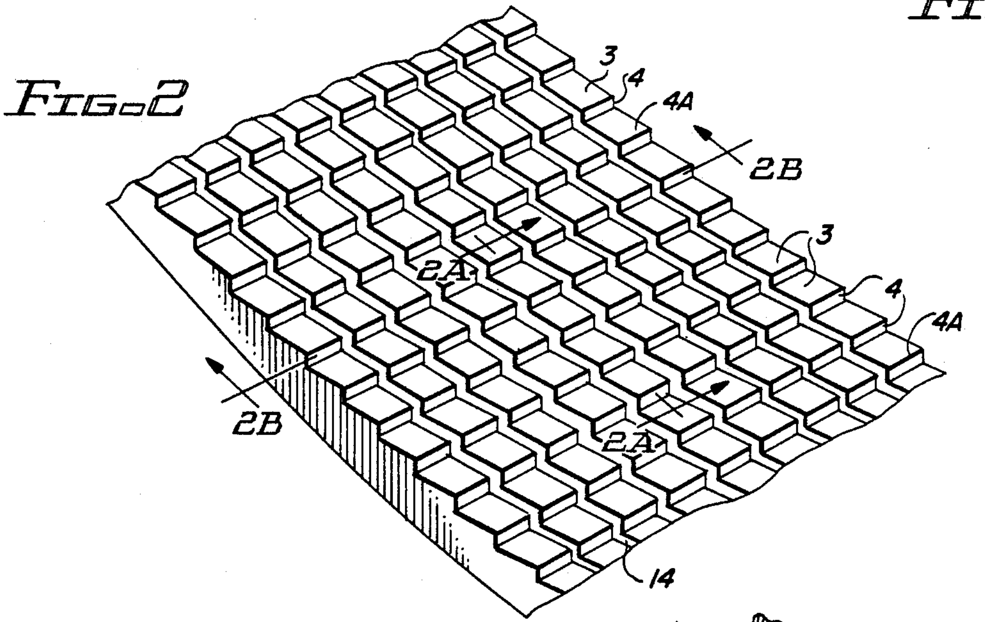
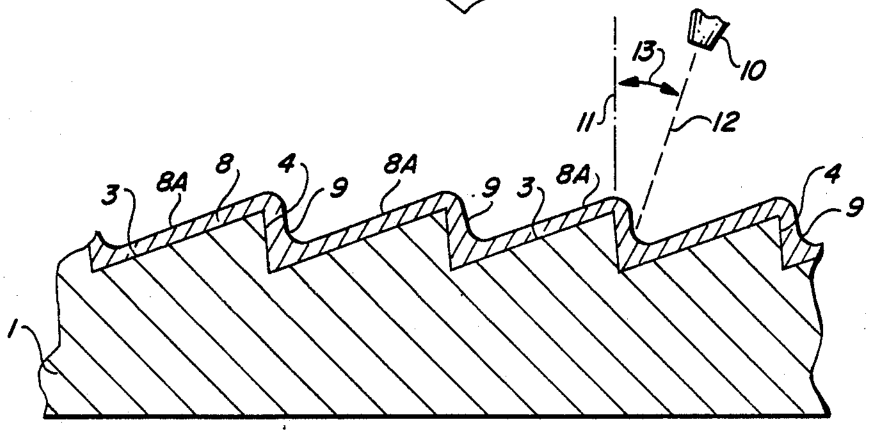
FIG. 3

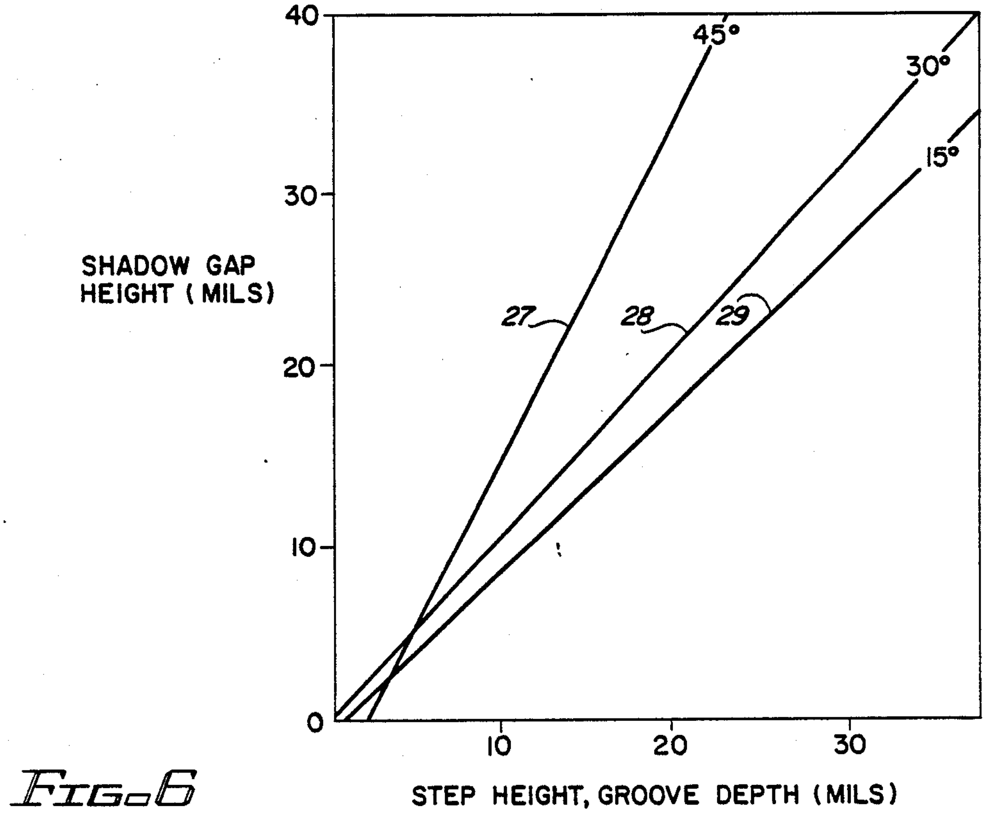
FIG. 6
FIG. 7
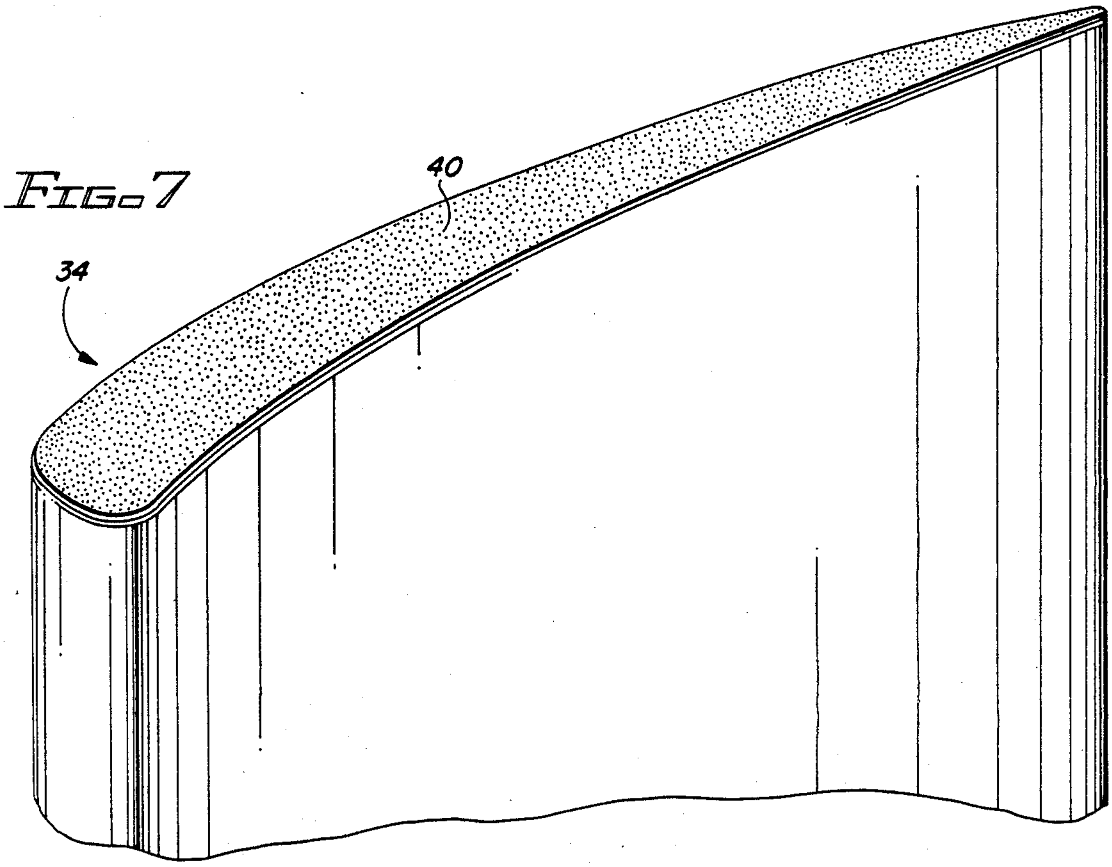

METHOD OF MAKING AN ABRADABLE STRAIN-TOLERANT CERAMIC COATED TURBINE SHROUD

This is a division of application Ser. No. 894,409 filed Aug. 7, 1986 now U.S. Pat. No. 4,764,089.

BACKGROUND OF THE INVENTION

The invention relates to insulative and abradable ceramic coatings, and more particularly to ceramic turbine shroud coatings, and more particularly to a segmented ceramic coated turbine shroud and a method of making by plasma spraying or other line of sight deposition processes to form shadow gaps that result in a segmented morphology.

Those skilled in the art know that the efficiency loss of a high pressure turbine increases rapidly as the blade tip-to-shroud clearance is increased, either as a result of blade tip wear resulting from contact with the turbine shroud or by design to avoid blade tip wear and abrading of the shroud. Any high pressure air that passes between the turbine blade tips and the turbine shroud without doing any work to return the turbine obviously represents a system loss. If an insulative shroud technology could be provided which allows blade tip clearances to be small over the life of the turbine, there would be an increase in overall turbine performance, including higher power output at a lower operating temperatures, better utilization of fuel, longer operating life, and reduced shroud cooling requirements.

To this end, efforts have been made in the gas turbine industry to develop abradable turbine shrouds to reduce clearance and associated leakage losses between the blade tips and the turbine shroud. Attempts by the industry to produce abradable ceramic shroud coatings have generally involved bonding a layer of yttria stabilized zirconia (YSZ) to a superalloy shroud substrate using various techniques. One approach is to braze a superalloy metallic honeycomb to the superalloy metallic shroud. The "pore spaces" in the superalloy honeycomb are filled with zirconia containing filler particles to control porosity. These techniques have exhibited certain problems. The zirconia sometimes falls out of the superalloy honeycomb structure, severely decreasing the sealing effectiveness and the insulative characteristics of the ceramic coating. Another approach that has been used to provide an abradable ceramic turbine shroud liner or coating involves use of a complex system typically including three to five ceramic and cermet layers on a metal layer bonded to the superalloy shroud substrate. A major problem with this approach, which utilizes a gradual transition in thermal expansion coefficients from that of the metal to that of the outer zirconia layer, is that oxidation of the metallic components of the cermet results in severe volumetric expansion and destruction of the smooth gradient in the thermal expansion coefficients of the layers. The result is spalling of the zirconia, shroud distortion, variation in the blade tip-to-shroud clearance, loss of performance, and expensive repairs. Yet another approach that has been used is essentially a combination of the two mentioned above, wherein an array of pegs of the superalloy shroud substrate protrude inwardly from areas that are filled with a YSZ/NiCrAlY graded system. This system has experienced problems with oxidation of the NiCrAlY within the ceramic and de-lamination of ceramic from the substrate, causing spalling of the YSZ. Another problem is that if the superalloy pegs are rubbed by the blades, blade tip wear is high, causing rapid loss of performance and necessitating replacement of the shroud and blades.

Another reason that ceramic turbine shroud liners have been of interest is the inherent low thermal conductivity of ceramic materials. The insulative properties allow increased turbine operating temperatures and reduced shroud cooling requirements.

Thus, there remains an unmet need for an improved, highly reliable, abradable ceramic turbine shroud liner or coating that avoids massive spalling of ceramic due to thermal strain, avoids weaknesses due to oxidation of metallic constituents in the shroud, and minimizes rubbing of turbine tip material onto the ceramic shroud liner.

SUMMARY OF THE INVENTION

Accordingly, it is an object of the invention to provide an improved high pressure gas turbine capable of operating at substantially higher efficiency over a longer lifetime than prior gas turbines.

It is another object of the invention to provide an abradable turbine shroud coating that allows reduced blade tip-to-shroud clearances and consequently results in substantially higher efficiency.

It is another object of the invention to increase the oxidation resistance of an abradable turbine shroud and to avoid massive spalling of the ceramic layer due to high thermal strain between the ceramic layer and the superalloy turbine shroud substrate.

It is another object of the invention to provide an abradable ceramic turbine shroud liner or coating that results in high density at a metal bonding interface and lower density and higher abradability at the gas path surface.

It is another object of the invention to provide a rub tolerant ceramic turbine shroud coating that reduces the shroud's cooling requirements, decreases shroud and retainer stresses and associated shroud distortion, minimizes leakage, and delays the onset of blade tip wear.

It is another object of the invention to provide an insulative coating which avoids spalling on a substrate that is subjected to severe high temperature cycling.

Briefly described, and in accordance with one embodiment thereof, the invention provides an abradable turbine shroud coating including a shroud substrate, wherein an array of steps is provided on the inner surface of the shroud substrate, and a segmented coating is provided on the steps such that adjacent steps are segmented from each other by shadow gaps or voids that propagate from the steps upward entirely or nearly through the coating. The shadow gaps are produced by plasma spraying ceramic onto the steps at a plasma spray angle that prevents the coating from being deposited directly on steep faces of the steps, which in the described embodiment are slant-steps. In the described embodiment of the invention,. longitudinal, circular parallel grooves and slant-steps having the same or similar heights or depths are formed (by machining, casting, etc.) in the inner surface of the shroud substrate. Shadow gaps propagate upward into the coating during deposition and segment adjacent steps from each other. After a suitable cleaning operation, a thin layer of bonding metal is plasma sprayed onto the slant-steps. The ceramic then is plasma sprayed onto the metal bonding layer at a deposition angle that causes the shadow gaps to form. The metal bonding layer is composed of NiCr- AlY (or other suitable oxidation resistant mwetallic layer), and the ceramic is composed of yttria-stabilized zirconia. The height of the slant-steps is 20 mils, and the spray angle of the plasma is 45 degrees, which results in the shadow-gap height being approximately twice the height of the slant-steps, or approximately 40 mils. The thickness of the ceramic layer, after machining to provide a smooth cylindrical surface, is approximately 50 mils. Thermal expansion mismatch strain between the ceramic and the substrate causes propagation of segmenting cracks from the tops of the shadow gaps to the machined ceramic surface. The shadow gaps accommodate thermal expansion mismatch strain between the metal and ceramic, preventing massive spalling of the ceramic layer. The plasma spray parameters are chosen to provide sufficient microporosity of the outer surface of the ceramic layer to allow abradability by turbine blade tips. If necessary, spray parameters are selected to provide a higher density at the ceramic-metal interface as needed to provide adequate adhesion. The turbine blade tips are hardened to provide effective brading of the ceramic surface and thereby establish a very close shroud to blade tip clearance, without smearing blade material on the ceramic layer. Very high efficiency, low loss turbine operation is thereby achieved without risk of spalling of the ceramic due to thermal strains.

BRIEF DESCRIPTION OF THE DRAWINGS

FIG. 1 shows a turbine shroud substrate.

FIG. 2 is an enlarged perspective view of the shroud substrate showing a pattern of the slant-steps and longitudinal isolation grooves in the inner surface of the shroud substrate.

FIG. 2A is a section view along section line 2A—2A of FIG. 2.

FIG. 2B is a section view along section line 2B—2B of FIG. 2.

FIG. 3 is a section view useful in explaining plasma spraying of a NiCrAlY bonding layer onto the slant-steps and grooves of FIG. 2.

FIG. 6 is a diagram showing the results of experiments to determine shadow gap heighth as a function of step height and groove depth for different ceramic plasma spray angles.

FIG. 7 is a partial perspective view illustrating a hardened turbine blade tip to abrade the ceramic turbine shroud coating of the present invention.

DESCRIPTION OF THE INVENTION

Figure 4:
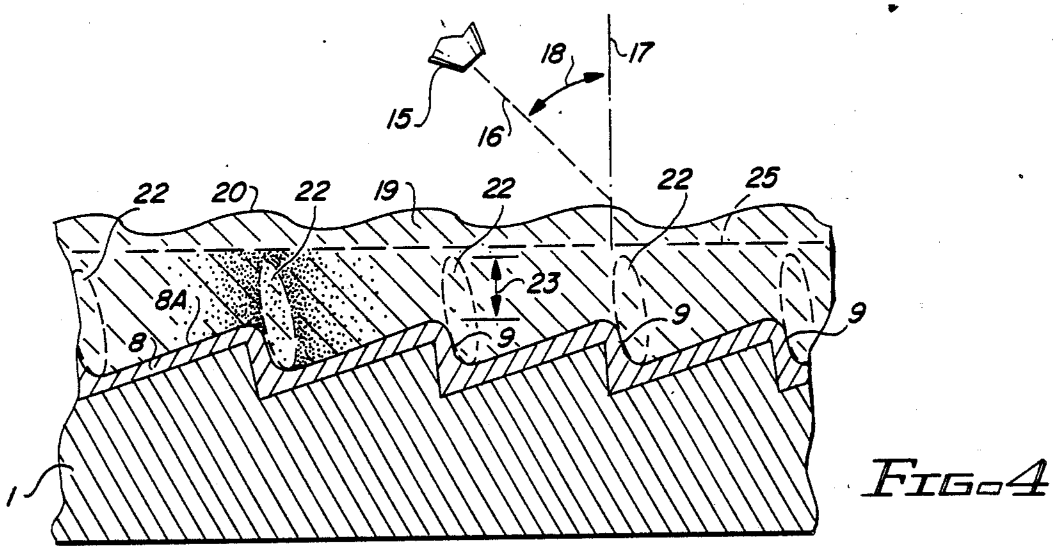
FIG. 4 is a section view useful in explaining plasma spraying of a zirconia layer onto the NiCrAlY bonding layer of FIG. 3.

Referring now to FIG. 1, the insulative abradable ceramic shroud coating is applied to a high temperature structural metallic (i.e., HS 25, Mar-M 509) or ceramic (i.e., silicon nitride) ring or ring segment 1 which has a pattern of slant-steps and/or grooves on the inner surface 2 to be coated. Depending upon the structural material, the steps and grooves (subsequently described) may be manufactured by a variety of techniques such as machining, electrodischarge machining, electrochemical machining, and laser machining. If the shroud is produced by a casting process, the steps and grooves pattern may be incorporated into the casting pattern. If the shroud is manufactured by a rolling process, the step-and-groove pattern may be rolled into surface to be coated. If the shroud is manufactured by a powder process, the step-and-groove pattern may be incorporated with the molding tool.

Referring next to FIGS. 2 and 2A–B, the inner surface of the turbine shroud 1 is fabricated to provide a grid of slant-steps 3 covering the entire inner surface 2 of the turbine shroud. The length 6 of the sides of each of the slant-steps 3 is approximately 100 mils. The vertical or nearly vertical edge 4 of each step is approximately 20 mils high, as indicated by reference numeral 5 in FIG. 2A.

The sides of the slant-steps 3 are bounded by continuous, spaced, parallel V-grooves 14, which also are 20 mils deep, measured from the peaks 4A of each of slant steps. (The grooves 14 need not be V-shaped, however.)

After a conventional grit cleaning operation, a thin layer of oxidation resistant metallic material, such as NiCrAlY having the composition 31 parts chromium, 11 parts aluminum, 0.5 parts yttrium and the rest nickel is plasma sprayed onto the slant-stepped substrate 1, as indicated in FIG. 3, thereby forming metallic layer 8. A plasma spray gun 10 oriented in the direction of dotted line 12 at an angle 13 relative to a reference line 11 that is approximately normal to the plane of the substrate 1 is provided. In the embodiment described herein, the spray angle 13 is approximately 15 degrees to ensure that the vertical walls 4 of the slant-steps 3 and the 100 mil square slant-steps are coated with the oxidation resistant metal (NiCrAlY) bonding layer materials as the shroud substrate is rotated at a uniform rate. The thickness of the NiCrAlY bonding layer 8 is 3–5 mils. A suitable NiCrAlY metal bonding layer 8 can be made by various vendors, such as Chromalloy.

The NiCrAlY layer 8 provides a high degree of adherence to the metal substrate 1, and the subsequent layer of stabilized zirconia ceramic material is highly adherent to NiCrAlY bonding layer 8.

Next, as indicated in FIG. 4, a layer of yttria stabilized zirconia approximately 50 mils thick is plasma sprayed by gun 15 onto the upper surface of the NiCrAlY bonding layer 8 as the shroud substrate is rotated at a uniform rate. The spray direction is indicated by dotted line 16, and is at an angle 18 relative to a reference line 17 that is perpendicular to a plane tangential to shroud substrate 1. Presently, a spray angle of 45 degrees in the direction shown in FIG. 4 has been found to be quite satisfactory in causing "shadow gaps" or voids 22 in the resulting zirconia layer 19. The voids occur because the plasma spray angle 18 is sufficiently large that the sprayed-on zirconia does not deposit or adhere effectively to the steeply sloped surfaces 9 of the metal bonding layer or to one of he nearly vertical walls of each of the grooves 14. This type of deposition is referred to as a "line of sight". deposition. Thus, high integrity, bonded zirconia material builds up on and adheres to the slant-stepped surfaces 8A of the NiCrAlY metal bonding layer 8, but not on the almost-vertical surfaces 9 thereof or on one nearly vertical wall of each of the grooves 14. This results in formation of either shadow gaps, composed of voids and regions of weak, relatively loosely consolidated ceramic material. These "shadow gaps" propagate upwardly most of the way through the zirconia layer 19, effectively segmenting the 100 mil square slant-steps.

The zirconia of the above-indicated composition is stabilized with 8 percent yttria to inhibit formation of large volume fractions of monoclinic phase material.

This particular zirconia composition has exhibited good strain tolerance in thermal barier coating applications. Segmentation of the ceramic layer will make a large number of ceramic compositions potentially viable for abradable shroud coatings. Chromalloy Research and Technology can perform the ceramic plasma spray coating of the shroud, using the 45 degree spray angle, and selecting plasma spray parameters to apply the zirconia coating with specified microporosity to assure good abradability.

In FIG. 4, reference numeral 25 represents a final contour line. The rippled surface 20 of the zirconia layer 19 subsequently is machined down to the level of machine line 25, so that the inner surface of the abradable ceramic coated turbine shroud of the present invention is smooth.

In the present embodiment of the invention, the shadow gaps 22 have a shadow gap height of approximately 40 mils, as indicated by distance 23 in FIG. 4.

Figure 5:
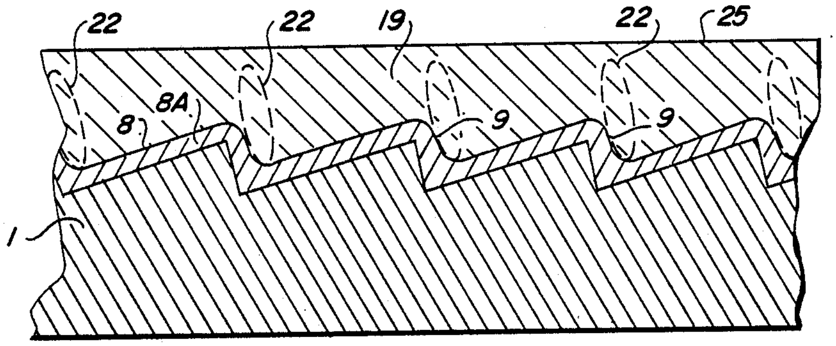
FIG. 5 is a section view showing the structure of FIG. 4 after machining of the upper surface of the zirconia layer to a smooth finish.

FIG. 5 shows the final machined, smooth inner surface 25 of the abradable ceramic shroud coating of the present invention.

I performed a number of experiments with different zirconia plasma spray parameters to determine a suitable spray angle, stand-off distance, and zirconia layer thickness. FIG. 6 is a graph showing the shadow gap heighth as a function of step heighth 5 (FIG. 2A). The experiments showed that the depths of the longitudinal V-grooves 14 (FIG. 2) should be at least as great as the step height 5. In FIG. 6, reference numerals 27, 28, and 29 correspond to zirconia plasma spray angles 18 (FIG. 4) of 45 degrees, 30 degrees, and 15 degrees. The experimental results of FIG. 6 show that the heights of the shadow gap 22 (FIG. 4) are approximately proportional to the step height and groove depth and also are dependent on the spray angle 18. For the experiments that I performed, the 45 degree spray angle and step heights (and groove depths) of 20 mils (the maximum values tested) resulted in shadow gaps heights of 40 mils or greater, which was adequate to accomplish the segmentation that I desired. It is expected that larger spray angles and greater step heights will result in effective segmentation of much thicker insulative barrier coatings and shroud coatings than described above.

Changing the distance of the plasma spray gun from the substrate during the plasma spraying of the yttria stabilized zirconia did not appear to affect the shadow gap height for the ranges investigated.

In order to adequately test the above-described abradable, segmented ceramic turbine shroud coating, it was necessary to modify the tips of the blades of a turbine engine used as a test vehicle by widening and hardening the blade tips to minimize wear of turbine blade tip metal on the ceramic shroud coating. In FIG. 7, blade 34 has a thin tip layer 40 of hardened material. Hardened turbine blade tips are well-known, and will not be described in detail.

A series of two tests were run with the above-described structure. The first test included several operating cycles, totalling approximately 25 hours. The purpose of this test was to verify that the morphology of the segmented ceramic layer would resist all of the thermal strains without any spalling, and would be highly resistant to high velocity gas eorsion under operating temperatures. Clearances were sufficiently large to avoid rubbing in this initial test. As expected, there was no evidence of gas erosion, and no evidence of spalling of any of the 100 mil square zirconia segments isolated by the shadow gaps. Also, there was no evidence of distortion of the metallic shroud structure.

In the second test, blade tip-shroud clearances were reduced to permit a rub and cut into the surface of the zirconia coating to test the abradability thereof. Visual examination of the ceramic coated shroud after that test indicated that it was abraded to a depth of about 10 mils. A sacrificial blade tip coating containing the abrasive particles were consumed during the cutting, and a small amount of the blade tip metal then rubbed onto the abraded ceramic coating. The relatively severe rub did not result in any spalling, further verifying the superior strain tolerance of the above-described segmented ceramic turbine shroud coating.

The above-described segmented ceramic turbine shroud coating has been shown to substantially increase turbine engine efficiency by reducing the clearance and associated leakage loss problems between the blade tips and the turbine shroud.

The above-described technique allows establishment of significantly tighter initial blade tip/shroud clearances for improved engine performance, and permits that clearance to be maintained over a long operating lifetime, because the abradability of the ceramic coating layer prevents excessive abrasion of the turbine blade tips, which obviously increases the clearance (and hence increases the losses) around the entire shroud circumference. Use of a ceramic material insulates the shroud, and consequently reduces the turbine shroud cooling requirements and decreases the shroud and retainer stresses and associated shroud ring distortion, all of which minimize leakage and delay the onset of blade tip rubbing and loss of operating efficiency.

More generally, the invention provides thick segmented ceramic coatings that can be used in other applications than those described above, where abradability is not a requirement. For example, the described segmented insulative barrier can be use in combustors of turbine engines, in ducting between stages of turbines, in exit liners, and in nozzles and the like. The segmentation provided by the present invention minimizes spalling due to thermal strains on the coated surface.

While the invention has been described with reference to a particular embodiment thereof, those skilled in the art will be able to make various modifications to the described structure and method without departing from the true spirit and scope of the invention. For example, there are numerous other ceramic materials than zirconia that could be used. Furthermore, there are numerous other elements than yttria which can be used to stabilize zirconia. Although a single microporosity was utilized in the zirconia layers tested to date, it is expected that increased microporisity can be obtained by further alteration of the plasma spray parameters, achieving additional abradability. If necessary, a graded microporosity can be provided by altering the plasma spray parameters from the bottom of the zirconia layer to the top, resulting in a combination of good abradability at the top and extremely strong adhesion to the NiCrAlY bonding metal layer at the bottom of the zirconia layer. A wide variety of regular or irregular step surface or surface "discontinuity" configurations could be used other than the slant-steps of the described embodiment, which were selected because of the convenience of making them in the prototype constructed. As long as steps on the substrate surface or discontinuities in the substrate surface have steep edge walls from which shadow voids propagate during plasma spraying at a large spray angle, so as to segment the ceramic liner into small sections, such steps or discontinuities can be used. A variety of conventional techniques can be used to fabricate the steps, including ring rolling, casting the step pattern into the inner surface shroud substrate, electrochemical machining and electrical discharging machining, and laser machining. Alternate line of sight flame spray techniques and vapor deposition techniques (e.g., electron beam evaporation/physical vapor deposition) can also apply ceramic coatings with shadow gasp. NiCrAlY is only one of many possible oxidation resistant bonding layer materials that may be used. Alternate materials include CoCrAlY, NiCoCrAlY, FeCrAlY, and NiCrAlY. Non-superalloy substrates, such as ceramic, stainless steel, or refractory material substrates may be used in the future. A bonding layer may even be unnecessary if the structural substrate has sufficient oxidation resistance under service conditions and if adequate adhesion can be obtained between the ceramic coatings and the structural metallic or ceramic substrate. The substrate need not be superalloy material; in some cases ceramic material may be used. The shroud substrate can be a unitary cylinder, or comprised of semicylindrical segments. The term "cylindrical" as used herein includes both complete shroud substrates in the form of a cylinder and cylindrical segments which when connected end to end form a cylinder. For radial turbine applications, the shroud may have a toroidal shape. For some applications, the shroud may be conical.

I claim:

1. A method of making a gas turbine comprising the steps of:

(a) providing a shroud substrate having a smooth inner surface;

(b) forming an array of steps on the inner surface so that each step includes a first face having a small slope and a second face adjoining the first face at a corner and having an approximately vertical slope, and also forming an array of intersecting grooves which separate the steps;

(c) performing a line of sight deposition of ceramic material uniformly over the steps at a spray angle that prevents ceramic from being directly deposited on the second faces so that a plurality of shadow gaps are formed in the ceramic layer as it is deposited, each shadow gap extending above an edge of a step through a substantial portion of the ceramic layer; and (d) machining a major exposed surface of the ceramic layer to provide an abradable ceramic liner on the inner surface of the shroud substrate.

2. The method of claim 1 including, before step (c), applying of a bonding material onto the inner surface of the shroud substrate to coat each of the steps to cause the ceramic to adhere to the first faces.

3. The method of claim 2 including plasma spraying the ceramic to produce a sufficiently high microporosity in the ceramic layer that the ceramic layer is abradable by tips of turbine blades during operation of the turbine.

4. The method of claim 3 wherein the bonding layer metal is composed of NiCrAlY and the ceramic is composed of stabilized zirconia.

5. The method of claim 4 wherein the zirconia is yttria-stabilized zirconia.

6. The method of claim 5 including providing a plurality of turbine blades surrounded by the shroud substrate and ceramic layer thereon and rotating the turbine blades to abrade a precisely predetermined amount of ceramic from the ceramic layer and thereby produce a minimum precise clearance between the tips of the turbine blades and the ceramic layer.

7. The method of claim 6 including providing a hardened coating on the outer tip of each of the turbine blades capable of abrading the ceramic without smearing superalloy metal of the turbine blades on the ceramic.

8. The method of claim 3 including plasma spraying the ceramic to produce a lower level of microporosity in the portion of the ceramic layer adjacent to the slant-steps than at the outer surface of the ceramic layer to thereby provide a combination of high abradability of the outer surface of the ceramic layer and high adherence of the ceramic layer to the first faces of the steps.

9. A method of making a lined shroud comprising the steps of:

(a) providing a shroud substrate of material having a smooth inner surface;

(b) forming an array of discontinuities on the inner surface including an array of intersecting grooves separating an array of raised areas, each discontinuity including a steep edge; and (c) performing a line of sight deposition of ceramic material uniformly on the inner surface at a spray angle that prevents ceramic from being directly deposited on the steep edges so that a plurality of shadow gaps are formed in the ceramic layer as it is deposited, each shadow gap extending from a steep edge through a substantial portion of the ceramic layer and segmenting the ceramic layer.

10. The method of claim 9 further including the step of machining a major exposed surface of the ceramic layer to provide a smooth inner ceramic surface.

11. The method of claim 10 including, before step (c), applying a layer of bonding material on the inner surface of the shroud substrate to coat each of the raised areas to cause the ceramic to adhere thereto.

* * * * *